United States Patent [19]
Guillon et al.

[11] Patent Number: 4,958,229
[45] Date of Patent: Sep. 18, 1990

[54] METHOD AND DEVICE FOR THE AREA ENLARGEMENT OF A TELEVISION PICTURE

[75] Inventors: Jean-Claude Guillon, Erstein; Jean-Claude Rufray, Mittelhausbergen, both of France

[73] Assignee: Deutsche Thomson-Brandt GmbH, Villingen-Schwenningen, Fed. Rep. of Germany

[21] Appl. No.: 328,360
[22] PCT Filed: Jun. 30, 1988
[86] PCT No.: PCT/EP88/00569
   § 371 Date: Feb. 23, 1989
   § 102(e) Date: Feb. 23, 1989
[87] PCT Pub. No.: WO89/00369
   PCT Pub. Date: Jan. 12, 1989

[30] Foreign Application Priority Data
Jul. 4, 1987 [DE] Fed. Rep. of Germany ....... 3722172

[51] Int. Cl.⁵ .............................................. H04N 3/22
[52] U.S. Cl. ..................................... 358/180; 358/160
[58] Field of Search ................... 358/180, 22, 160, 77, 358/451

[56] References Cited
U.S. PATENT DOCUMENTS

| | | | |
|---|---|---|---|
| 4,134,128 | 1/1979 | Hurst | 358/22 |
| 4,220,965 | 9/1980 | Heitmann et al. | 358/22 |
| 4,282,550 | 8/1981 | Coviello | 358/160 |
| 4,528,585 | 7/1985 | Bolger | 358/22 |
| 4,547,708 | 10/1985 | Haferl | 358/180 |
| 4,700,228 | 10/1987 | Heerah | 358/22 |
| 4,734,785 | 3/1988 | Takei et al. | 358/77 |
| 4,774,581 | 9/1988 | Shiratsuchi | 358/180 |
| 4,843,475 | 6/1989 | Imai | 358/180 |
| 4,891,702 | 1/1990 | Nakayama et al. | 358/180 |

FOREIGN PATENT DOCUMENTS

| | | |
|---|---|---|
| 2839878 | 3/1980 | Fed. Rep. of Germany . |
| 3029425 | 4/1982 | Fed. Rep. of Germany . |
| 3421780 | 12/1985 | Fed. Rep. of Germany . |
| 2588709 | 4/1987 | France . |
| 2073536 | 11/1981 | United Kingdom . |

Primary Examiner—Howard W. Britton
Assistant Examiner—James Juo
Attorney, Agent, or Firm—Joseph S. Tripoli; Eric P. Herrmann; James B. Hayes

[57] ABSTRACT

Area enlargement of television pictures can be achieved by stretching the picture at the same time in the vertical and horizontal directions. In the simplest case this can be accomplished by increasing the scanning amplitude. As the horizontal deflection consumes the greatest part of the energy converted in a picture reproduction apparatus and as it requires high-powered modular elements, an increased scanning amplitude would undesirably augment the energy consumption and further increase the demand on the performance of the modular elements in use. Image enlargement according to this invention is accomplished by storing the horizontally succeeding picture information of a just transmitted or reproduced scanning line and by subsequently displaying the sequential picture information of an area of the scanning line stretched over the whole horizontal period.

8 Claims, 3 Drawing Sheets

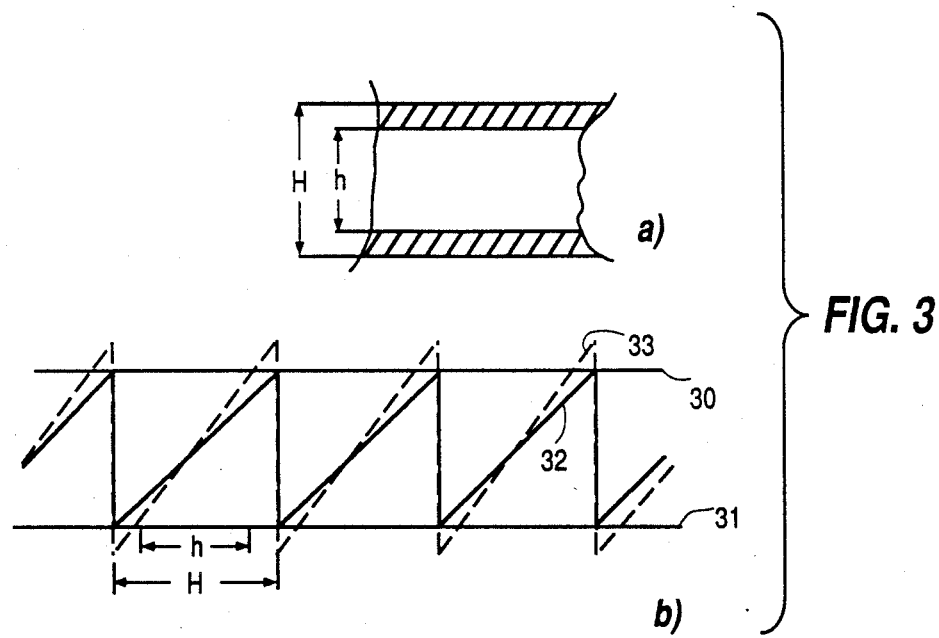
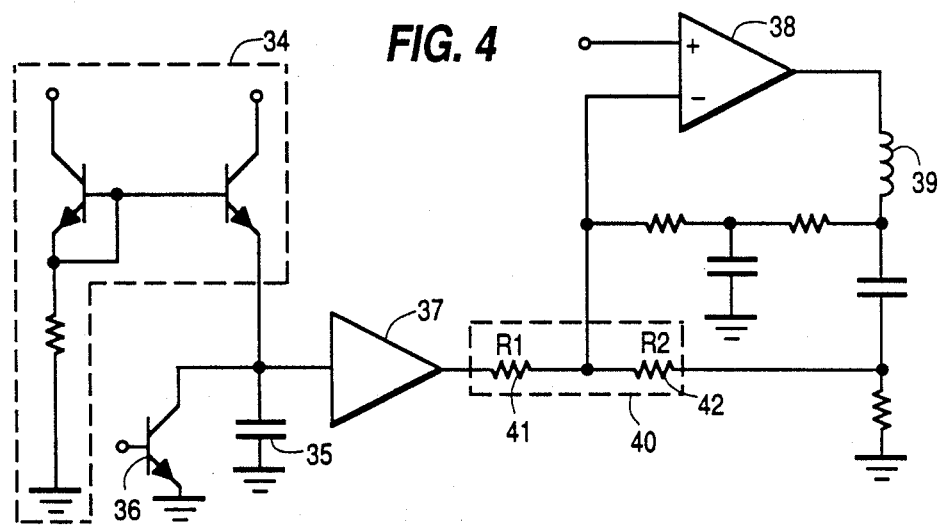

METHOD AND DEVICE FOR THE AREA ENLARGEMENT OF A TELEVISION PICTURE

This invention relates to a method for the area enlargement of a television picture.

Background of the Invention

When transmitting films, whose format has a height-breadth ratio different from that of a television screen, it may be desirable to enlarge the displayed picture, thus making use of the full screen format. It also may be desirable to display several scenes of a television transmission in a larger format.

The picture can be stretched or expanded by increasing the vertical and horizontal scanning amplitudes. It will be recognized that the horizontal deflection circuitry consumes the greatest energy in a receiver and imposes the greatest strain on the modular elements. A further increase in the horizontal scanning amplitude would further increase the energy consumption and the load on the modular elements.

Therefore, it is an object of this invention to provide a method for the area enlargement of a television picture, which renders it possible to stretch the television picture in the horizontal direction while maintaining the horizontal deflection.

Summary of the Invention

In this invention expansion of the picture in the horizontal direction is achieved by a stretching in time rather than by a geometrical stretching. This occurs by reproducing only those sections of the scanning line that are to be displayed and by suppressing the other ones. Thus, the contents of the picture can be distributed over the full horizontal width while maintaining the horizontal deflection. A further advantage of this method lies in the fact that by this stretching in time no loss in brightness occurs and no problems in picture geometry arise demanding special remedial measures. Furthermore, it is possible to select particular areas of the television picture for the enlargement.

Apparatus to perform the invention includes a memory circuit for storing at least a portion of a scanning line to be expanded and a control circuit for establishing periods that video information is to be written-to and read-from the memory circuit.

By storing the picture information of a scanning line or at least of the area of the scanning line that is to be displayed, a time-independent access to this picture information is provided. Correspondingly, a stretching in time in the horizontal direction can be achieved, if the picture information of the area of the scanning line is read-out in such a way that it is evenly distributed over a line filling the total screen format.

It is especially suitable to provide for two read-write memories (3,4), whose data-input units (8, 9) are connected to an incoming picture signalling line (1) and whose data-output units (10, 11) are connected by a reversing switch (5) to an outgoing picture signalling line (6). These read-write memories are alternately activated in the modes "write" and "read". This means, that one read-write memory is in the mode "read" and the other in the mode "write" and subsequently the former read-write memory is in the mode "write" and the latter in the mode "read".

Further developments and an advantageous design of the invention result from the claims, the description, and the drawings that illustrate an example of construction of the object of the invention.

Brief Description of the Drawings

FIG. 3a is a pictorial diagram for illustrating the display procedures in the stretching of a televion picture in the vertical direction according to a further development of the method according to the invention.

FIG. 3b is a waveform diagram useful in explaining vertical expansion of the picture by means of altering the vertical deflection drive signal.

FIG. 4 is a block diagram of the circuit arrangement for the stretching of a televion picture in the vertical direction according to a further development of the invention.

Detailed Description

Figure 1:
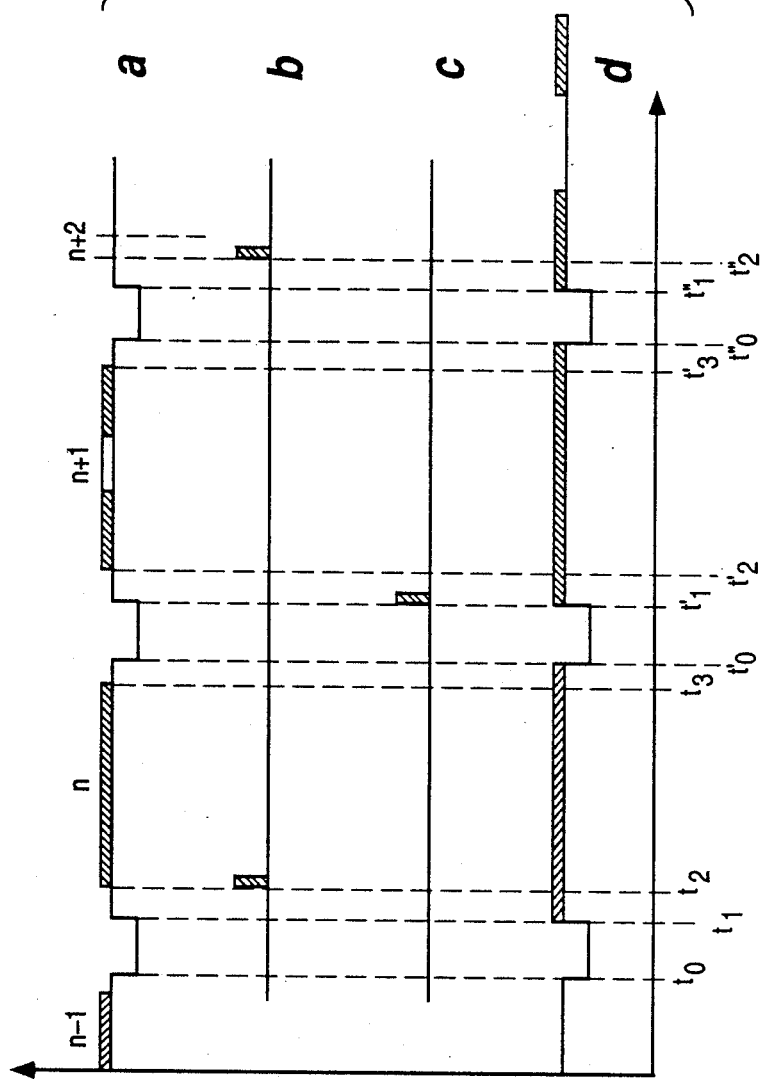
FIG. 1 is a waveform diagram illustrating the transmission, storage, and reading procedures for the stretching of a television picture in the horizontal direction corresponding to a realization of the method according to the invention.

Referring to FIG. 1, there is shown the distribution in time of the transmitted or reproduced signals for subsequent lines of a television picture. At the time t0 of the waveform, a horizontal flyback commences that terminates at the time t1. From the time t1 to the time t0' the picture information is transmitted and reproduced and would become visible on the television screen in case of unchanged display. For area enlargement however, a section between the times t1 and t0' would be selected and edited for a stretched display.

In this instance according to FIG. 1b a first memory is conditioned at the time t2 to store picture information occurring between the times t2 and t3, and the memory content, as illustrated in FIG. 1d, is read-out starting from the time t1'. The reading-out is performed stretched in time and over the length of a line and thus terminates at the time t0".

The signals transmitted or reproduced in the line with the ordinal number n are therefore displayed shifted in time in the line n+1. The signals transmitted or reproduced in the line with the ordinal number n+1 are written in a second memory between the times t2' and t3' and are displayed on the screen in a period to which the line n+2 belongs.

The writing-in and reading-out is always performed alternately between two memories. The illustration of FIG. 1 only concerns one of these two memories. The other memory operates with signals corresponding to signals illustrated in FIG. 1b and FIG. 1c, shifted by one scanning line period.

Figure 2:
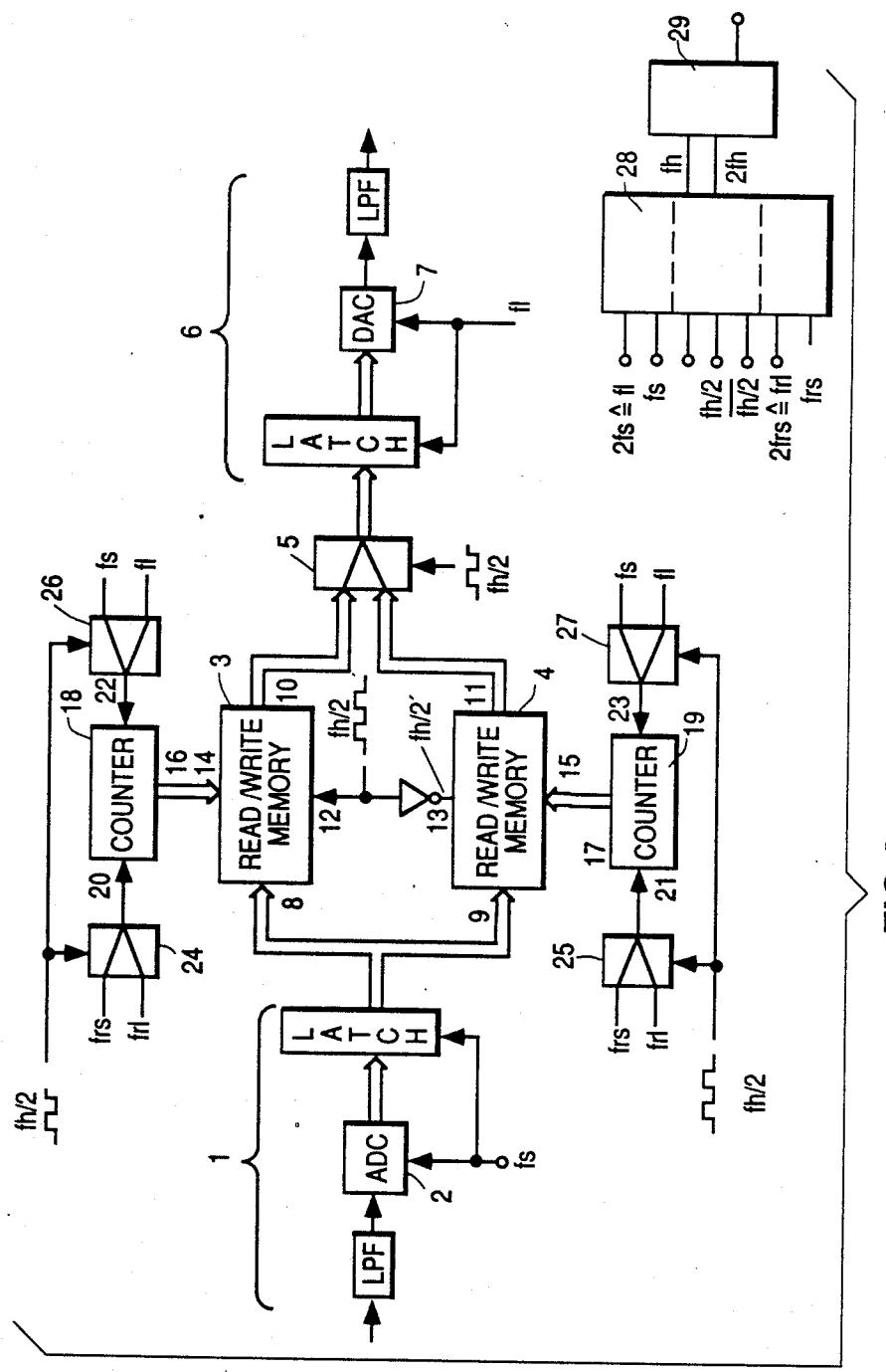
FIG. 2 is a block diagram of a circuit arrangement for the stretching of a television picture in the horizontal direction according to an example of application of the invention.

FIG. 2 illustrates a block diagram of exemplary circuitry embodying the invention. An incoming signal path 1 including a digitizer 2 is coupled to a first read-write memory 3 and a second read-write memory 4. The memories 3 and 4 are connected by a multiplexer 5 to an outgoing signal path 6 including a digital-to-analog converter 7. The read-write memories 3 and 4 are equipped with data-input units 8 and 9, data-output units 10 and 11, read-write control input units 12 and 13, as well as address input units 14 and 15. The address input units 14 and 15 of the read-write memories 3 and 4 are connected to the counter output units 16 and 17 of the location counters 18 and 19. The location counters 18 and 19 have reset input units 20 and 21 as well as clock input units 22 and 23. By means of a control circuit 28, the reset input units 20 and 21 are activated by respective multiplexers 24 and 25, the clock input units 22 and 23 are activated by respective multiplexers 26 and 27. A line deflection circuit 29 is also connected to the control circuit 28.

For the sake of clarity the individual control lines are not drawn into the illustration; only the signals are depicted at the respective control input or output terminals. The control signals are the switch signals fh/2 and fh/2', that is, the inverse signal of fh/2. These signals are symmetrical keying signals and change their status after each line period of the transmitted or reproduced picture signal. The control signals serve for the reciprocal change-over from the mode "write" to the mode "read", and vice versa, of the read-write memories 3 and 4 over the control input units 12 and 13. In addition the demultiplexer 5 is activated, in order to connect alternately the data output unit 10 and the data output unit 11 to the outgoing signal path 6. Finally, the mulitplexers 24, 25, 26, and 27 are activated with these keying signals.

The control signals fr1 and frs are reset signals for the counters 18 and 19 and correspond to the reset signals depicted in FIG. 1b and FIG. 1c at the times t2 or t1 and at the respective subsequent times. The frequencies of the reset signals frs and fr1 correspond in their values to the line frequencies of the transmitted or reproduced picture, but are shifted in time. Finally, clock signals are produced that are applied to the counters 18 and 19 via the multiplexer 26 and 27 and the clock input units 22 and 23. The clock signals fs are for the mode "write" and the clock signals f1 are for the mode "read". The frequency of the clock signals corresponds to the number of picture information or picture points divided by the time period in which these picture points are transmitted and reproduced or displayed. The clocking rate of the clock signal fs corresponds to the picture information flow, predetermined by the maximum resolution; the clocking rate f1 is smaller by the respective factor, by which the picture is to be stretched.

The picture signals in digital form reach the data-input units 8 and 9 of the read-write memories 3 and 4 via the incoming signal path 1. It is presumed that at the time "to" the read-write memory 3 is in the mode "write" and the memory 4 is in the mode "read". Then the multiplexer 24 is activated in such a way that it connects the reset signals frs through to the reset input unit 20, and the multiplexer 25 is activated in such a way that it connects the reset signals fr1 through to the input unit 21. Furthermore, the multiplexer 26 is switched in such a way that it connects the clock signals fs through to the clock input unit 22 and the multiplexer 27 connects the clock signals f1 through to the clock input unit 23. Subsequently, the picture data of line n are written into the read-write memory 3, in which all storage locations required are addressed in sequence. During line n the read-write memory 4 is conditioned, beginning at time ', to read out picture data stored during line interval n−1. Picture data read from read-write memory 4 is coupled to the outgoing signal path 6 via multiplexor 5. Subsequently, the read-write memories 3 and 4 are conditioned to operate in alternate modes, that is the read-write memory 3 is placed in the read mode and the read-write memory 4 is placed in the write or store mode. In order to switch the output unit 10 of the read-write memory 3 to the outgoing signal path 6, the demultiplexer 5 is switched over. Now the procedure described above is repeated after each line period of the transmitted or reproduced picture signal.

FIG. 3a illustrates a picture area with the height h that is to be stretched to the height H. FIG. 3b illustrates the time change of the vertical scanning amplitude. A vertical amplitude filling the screen format lies between the upper limit 30 and the lower limit 31. If at present the vertical amplitude is set at this value, as is the case with the waveform 32, all lines containing picture information are visible. If the amplitude, however, is increased, as depicted by waveform 33, the increased slope of the waveform causes the waveform to intersect the area limits 30 and 31 and only the lines of an area h between both the intersection points are visible. This area, however, is stretched to the full height of the screen format.

A suitable circuit arrangement for selectably generating vertical deflection signals is illustrated in FIG. 4. It comprises a source of electric power 34, a charging capacitor 35 which can be charged by this source and which can be by-passed by a switch 36. The charging capacitor is coupled via an impedance converter 37, to a vertical amplifier 38 including a network 40 of resisitors 41 and 42, determining the amplification of the amplifier. The output of the vertical amplifier 38 is coupled to a deflection coil 39.

The capacitor 35 is charged cyclically by the source of electric power 34 and discharged by switch 36. The increase of the inclining part of the curve is determined by the capacitance of the capacitor 35 and the amplitude of current provided by the source of electric power 34. The impedance converter 37 serves to couple the capacitor 35 to the vertical output stage 38 without affecting the charging characteristics of the capacitor charging circuit. The amplification of the vertical output stage 38 is adjustable by the ratio of the resistors 42 and 41 of the resistor network. Thus, the voltage at the capacitor 35 can effect a deflection current having the determined amplitude in the scanning coil 39. When operating corresponding to standards, the current of the source of electric power 34, the value of the capacitor 35, as well as the ratio of the resisitors 42 and 41 are adjusted in such a way, that the transmitted or reproduced picture is depicted on the screen in a format-filling way. By selectively increasing the resistor ratio 42 to 41, descreasing the coefficient of capacitance of the capacitor 35, increasing the amplitude of current of the source of electric power 34, or by a combination of the aforesaid measures, the vertical scanning amplitude can be increased, so that a particular area of the television picutre can now be depicted in a format-filling way. The logical elements can be provided with appropriate reversing switches, in order to be able to switch between the mode conforming to standards and the area enlargement.

What is claimed is:

1. A method for expanding an area of an image represented by a television signal including horizontal lines defining a first dimension and a sequence of horizontal lines defining a second dimension, said method comprising:

writing into memory means, signal representing a horizontal line of said television signal;

reading said memory at a rate such that a portion of signal representing less than a complete horizontal line occupies a time interval corresponding to a complete horizontal line;

selectably generating a vertical deflection signal having an amplitude in excess of an amplitude for normally displaying a television signal on a display means;

applying said generated vertical deflection signal to deflection coils of said display means; and applying signal read from said memory means to a signal input of said display means.

2. Circuitry for generating from a video signal representing an image, a signal representing an expanded image, said circuitry comprising:

memory means having storage capacity for storing at least a portion of a horizontal line representing an area of an image to be expanded;

memory control circuitry for conditioning said memory means to store video signal from successive horizontal lines, and for conditioning said memory means to read out said portion over an interval of a horizontal line greater than an interval of a horizontal line occupied by said portion in said video signal, to produce a horizontally expanded image;

a display device having a signal input terminal and including circuitry responsive to horizontal and vertical deflection signals for producing a raster scan, the vertical direction of said raster scan being orthogonal to said horizontal line;

means for coupling signal from said memory means to said signal input terminal of said display means; and means for generating a vertical deflection signal selectable between a first mode for generating a standard raster and a second mode for effectively stretching a displayed image in said vertical direction.

3. Circuitry as set forth in claim 2 wherein said memory means comprises two read-write memories having data input terminals connected to receive said video signal, and having output terminals coupled to utilization means, and wherein said memory control means includes circuitry for alternately conditioning said first and second read-write memories to operate in alternate opposite modes of storing and reading signal.

4. Circuitry as set forth in claim 3 wherein said memory control means includes:

a source of first and second clock signals, said first and second clock signals having frequencies corresponding to frequencies for writing video signal to and reading signal from said memory means respectively;

first and second address counters, responsive to clock signals for generating address signals for said first and second memories respectively;

means for alternately applying said first and second clock signals to said first address counter and applying said second and first clock signals to said second address counter.

5. The circuitry set forth in claim 4 further including a source of a third clock signal having a frequency of one half the rate of occurrence of said horizontal lines and wherein said means for alternately applying clock signals are conditioned by said third clock signal to switch between said first and second clock signals.

6. The circuitry set forth in claim 3 further including a source of clock signal having a frequency corresponding to one half the rate of occurrence of said horizontal lines and said memory control means is responsive to said clock signal for conditioning said read-write memories to operate in alternate modes.

7. The circuitry set forth in claim 2 wherein the means for generating a deflection signal generates a signal having a first amplitude in said first mode and a signal having a second amplitude, larger than said first amplitude in said second mode.

8. Apparatus including a display device for displaying an image represented by a video signal, said video signal occurring as horizontal lines and said display device including deflection means for generating a raster scan in at least a vertical direction orthogonal to said horizontal lines, said apparatus also including circuitry for enlarging a portion of said image, said circuitry comprising:

a source of said video signal;

memory means coupled to said source and conditioned to write signal data therein at a first rate and to read data therefrom at a second rate, slower than said first rate, to produce a signal representing a horizontally expanded image relative to said image represented by said video signal; and vertical deflection signal generating means coupled to said display device for selectably generating a first vertical deflection signal in a first mode for normally displaying an image in the vertical direction, and a second vertical deflection signal in a second mode for causing a displayed image to be expanded in the vertical direction.

* * * * *